United States Patent [19]

Holzknecht

[11] 4,289,561

[45] Sep. 15, 1981

[54] METHOD FOR PREPARING A PLURALITY OF LABELS

[76] Inventor: Walter Holzknecht, Konrad Adenauerstrasse 6, D-808 Fürstenfeldbruck, Fed. Rep. of Germany

[21] Appl. No.: 78,588

[22] Filed: Sep. 19, 1979

[30] Foreign Application Priority Data

Sep. 23, 1978 [DE] Fed. Rep. of Germany ....... 2841515

[51] Int. Cl.[3] ....................... B32B 31/00; A44C 3/00; B26D 7/06; B65H 39/02

[52] U.S. Cl. .................................. 156/265; 156/277; 40/2 R; 83/408; 270/58

[58] Field of Search ................. 156/265, 264, 63, 277, 156/384; 40/2 R, 594, 595, 360; 428/40, 41, 42, 79, 914; 101/228, 226; 270/58, 52.5; 83/408

[56] References Cited

U.S. PATENT DOCUMENTS

| | | | |
|---|---|---|---|
| 702,328 | 6/1902 | Parker | 156/63 |
| 2,062,280 | 12/1936 | Aanesen et al. | 156/265 |
| 3,130,984 | 4/1964 | Fenberg | 40/595 |
| 3,703,044 | 11/1972 | Gregory | 40/2 R |

FOREIGN PATENT DOCUMENTS

| | | | |
|---|---|---|---|
| 1857 | of 1914 | United Kingdom | 40/360 |
| 1522887 | 8/1978 | United Kingdom . | |

*Primary Examiner*—William A. Powell
*Assistant Examiner*—L. Falasco
*Attorney, Agent, or Firm*—Cushman, Darby & Cushman

[57] ABSTRACT

A method for forming a large number of labels from a base sheet on which markings and symbols are imprinted on rows and columns. This base is reinforced with a transparent sheet cemented to the front of the base and/or a backing foil or material cemented to the rear face of the base. Perpendicular edges are cut, parallel to the rows and perpendicular to the columns respectively. Cuts are then made making individual strips. The strips are realigned, connected together and cuts are made, separating the reconnected base into a series of labels.

12 Claims, 2 Drawing Figures

METHOD FOR PREPARING A PLURALITY OF LABELS

BACKGROUND AND SUMMARY OF THE INVENTION

Many very different ways of preparing labels are known. It can be done by engraving the desired symbols on a carrier material of appropriate shape or by providing a piece of roughened plastic foil with the symbols—for example, by putting the symbols on with a typewriter and then cementing the piece of foil bearing the symbols onto a carrier foil. It can also be done by cementing the symbols on a transparent plastic foil, with a varnish which is or becomes transparent at the latest after hardening and which has an index of refraction sufficiently similar to that of the plastic foil. The varnish may be sprayed or painted on the foil. Suitable varnishes with the required qualities are known, but plastic varnishes are recommended, especially those which are irreversible when hardened. For instance, a two-component varnish may be used, such as the well-known "DD" varnishes which, when hardener is added, cross-link to form a plastic coating.

The method of preparing a rather large number of labels by imprinting the symbols on individual backings cut to size by the silk-screen process is also known. However, that is a method which is only useful when a large number of labels, all bearing the same symbols or the same lettering, is required.

Another method for preparing a number of labels consists of putting all of the desired symbols or lettering on one base—with a typewriter, with letters which are applied by rubbing, or the like—and then cutting up the base to make the individual labels. It is relatively easy to perform such a cutting process if the base is a sheet of paper or a thin plastic foil. However, the cutting becomes difficult if the base is relatively stiff, or, if after the symbols have been put on, the base is reinforced by cementing on a relatively stiff plastic foil covering the symbols or by cementing a backing foil onto the back of the base. For practical purposes, a base reinforced in that way cannot be cut up in the usual manner so that all labels are of the same size and the lettering is located centrally on all labels and the edges of the individual labels are exactly straight and run exactly parallel and/or perpendicular to each other.

All of these methods of preparation have a disadvantage when they are used in the preparation of individual labels for the many uses to which they can be put, e.g., for switchboards and other installations, where a large number of labels of the same size, but with different lettering, is required.

Therefore, it is the object of the invention to provide a method which makes it possible to prepare a large number of individual labels whose symbols or letters are first put on a base which is common to all labels and which thereafter is cut in such a way that the edges of the individual labels are exactly parallel and/or perpendicular to each other, with the lettering being located centrally on the individual labels if that is desired.

A method for preparing a large number of labels has been devised in which the symbols for the labels are put on a base arranged in marked rows and columns, a transparent plastic foil is then cemented onto the face of the base and/or a backing foil or material is cemented onto the back of the base. The base which has been reinforced in that way is then cut up in one of two methods. One method is to first cut the base so that two adjoining edges of the base, which is bound with the plastic foil and/or the carrier foil or material, are cut at right angles to each other, so that one edge runs parallel to the rows on which the symbols have been placed and the other edge runs perpendicular to those rows. The base is then laid with one of its edges against a bearing surface and cut along the markings which are parallel to the cutting edge (perpendicular to the edge bearing on the bearing surface). The resulting strips made in this way are reassembled in the same sequence and aligned by means of a carrier foil or material. The reassembled base is then laid with its second adjoining edge on a bearing surface and cut along the markings (perpendicular to said second adjoining edge). A second method is to cut the base row by row according to the markings, align the strips made in this way centrally with respect to a column, connect the strips by means of a carrier material in the area of that column and then cut along the edges of the column. The remaining strips portions are then aligned centrally with respect to their respective columns, connected by means of a carrier material and cut.

Thus, in accordance with the methods of the invention, a base is made with markings and symbols which is reinforced by the plastic foil and/or the backing foil or material in such a way that the inaccuracies which arise when cutting in one direction—say, cutting row by row—are not added in with or onto the inaccuracies which arise when subsequently cutting perpendicular to the first cutting operation. Specifically in the case of the first-mentioned method, when the strips resulting from the first cutting operation are in the same sequence and alignment by means of the carrier material and are joined together again, what results is the original form of the base, and consequently the individual labels and the symbols and letterings of the individual labels lie in the same positions with respect to each other again. Thus a second cutting can take place without the first cutting having any influence on the shape, accuracy and direction of the second cutting, and consequently having any influence on the label edges resulting from the second cut.

In the second method, a row by row cutting takes place first, and then the individual columns are aligned centrally. This can be accomplished by laying them on a grating for example. Then all strips of a column aligned in that way are bound by means of the carrier foil or material, so that a cutting in the direction in which the columns extend can again take place without the course of such a cut being influenced by the course of the cuts which were previously made in the direction in which the rows extend. Preferably, the carrier foil or material used for reassembling the strips can itself be pliable—for example, the carrier foil or material can consist of a transparent plastic foil. If that is so, the cementing is naturally carried out in such a way that the carrier foil or material can also easily be pulled off again. Consequently, the labels of one column adhere to the carrier material after the cutting has taken place so that the user can select the desired label very easily and detach it from the carrier material in order to place it in the desired location.

BRIEF DESCRIPTION OF THE DRAWINGS

In the following, the invention is described in more detail with the help of the drawings, in which.

DETAILED DESCRIPTION OF THE PREFERRED EMBODIMENT

Figure 1:
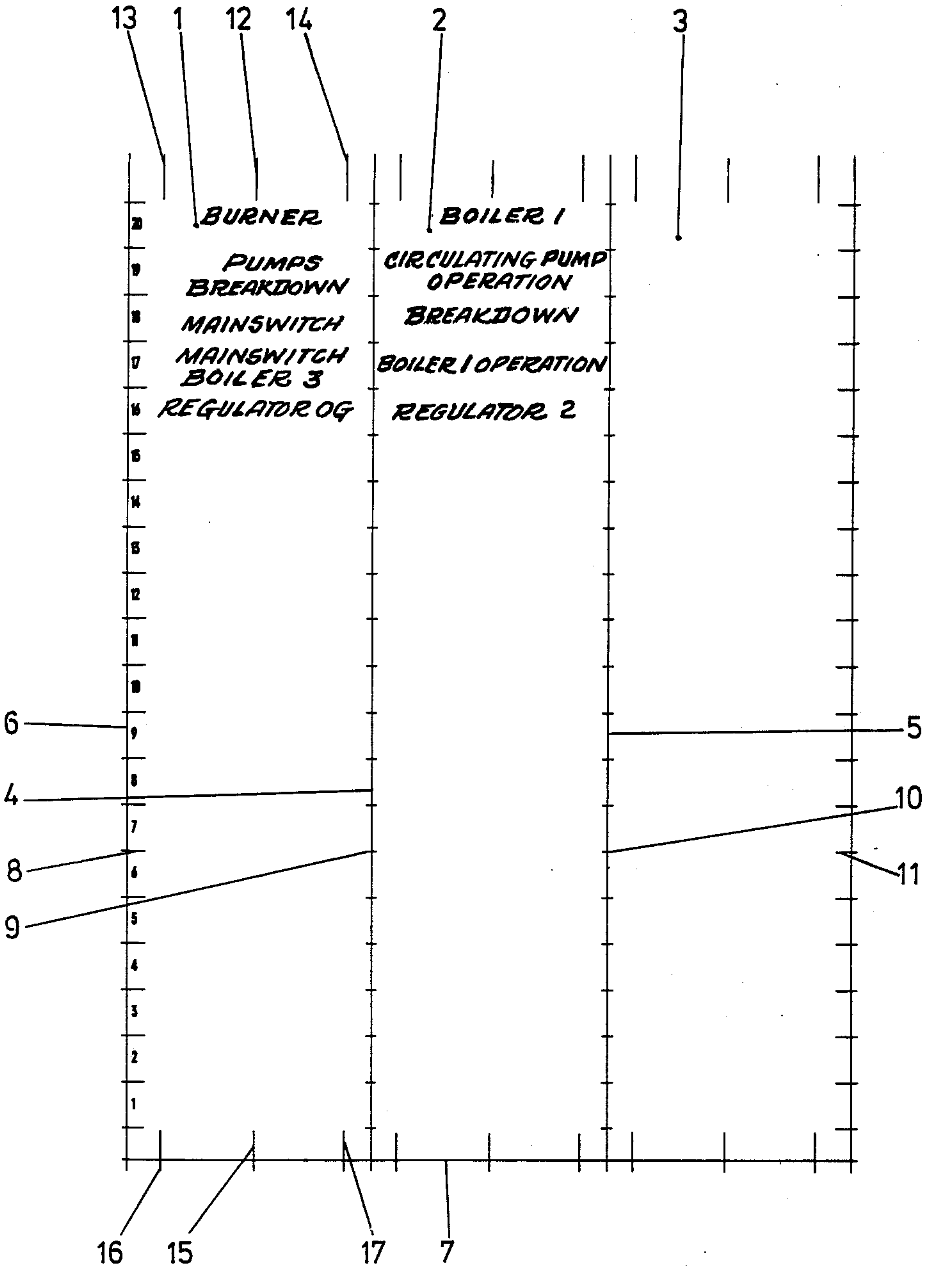
FIG. 1 shows an embodiment with a base for preparing labels which is partially covered with lettering.

The base shown in FIG. 1 is made of a transparent material such as a thin plastic foil with a roughened surface, which can have lettering or symbols put on it with a typewriter, or in some similar way. The base is divided into three columns—1, 2 and 3—and the middle column is separated from the outer ones by the lines 4 and 5. There are markings in the individual columns, although only the markings in Column 1 are labeled, with the markings 12 and 15 indicating the middle of the column and the markings 13 and 16 and 14 and 17 indicating the edges along the sides of the labels which are to be prepared. Markings for the lines separating the horizontal rows—8, 9, 10 and 11, for example—are provided, and the individual rows are numbered from 1 through 20, inclusively, along the left-hand edge.

To prepare a large number of labels, the lettering is put on the base in the manner indicated in FIG. 1, so that the lettering is located in the middle of the columns and rows. After the lettering is completed, the base may be cemented to a white backing foil so as to obtain a white background, and a transparent plastic foil may be cemented on top of the base to form a composite sheet, preferably with a transparent adhesive which has the same refraction index as the material of the base such the well known two component "DD" varnishes which, when hardener is added, cross link to form a plastic coating.

It should be pointed out that a white backing foil which has an adhesive covered with protective foil on its back can be used so that self-cementing labels can be prepared. After the backing foil and the transparent plastic foil have been put on, the unit formed in this way may be put through a hand-operated roll press in order to produce a firm union of all the individual layers.

Since it generally is not possible to fasten the transparent plastic foil and/or the backing foil or material to the base in such a way that a precise alignment of the adjoining side edges with each other results, the base has two lines 6 and 7 running perpendicular to each other, the line 6 of which runs parallel to the lines 4 and 5, that is, parallel to the direction of the columns. These lines 6 and 7 are used to obtain edges running perpendicular to each other. The base, with the transparent plastic foil and/or the carrier foil or material may be cut with a simple lever shears, first along the line 6 and then along the line 7, so that one gets one bearing edge which runs parallel to the direction of the columns and one bearing edge which runs parallel to the direction of the rows. Now the base sheet with attached foil or foils is laid along one bearing edge against a bearing surface and cut perpendicular to said one bearing edge into strips making use of the line markings.

The individual strips are then put back together again in the same sequence and alignment such that all strips are in exact alignment with each other as they were previously aligned.

The next step is to cement a carrier foil or material made of transparent material onto the strips which have been put together again. The lettering and markings are discernible through that foil.

The strips which have been put back together again by means of the carrier material are then laid with the second bearing edge corresponding to the line 6 or the edge corresponding to the line 7 against a bearing surface and then, if the first cutting was along the rows, cut perpendicular to the second bearing edge along the markings 13, 16 and 14, 17 and the corresponding markings of the columns 2 and 3. Labels of the desired size then result from this cutting, and all markings provided on the base have been removed during the cutting since they do not extend into the area of the labels.

Figure 2:
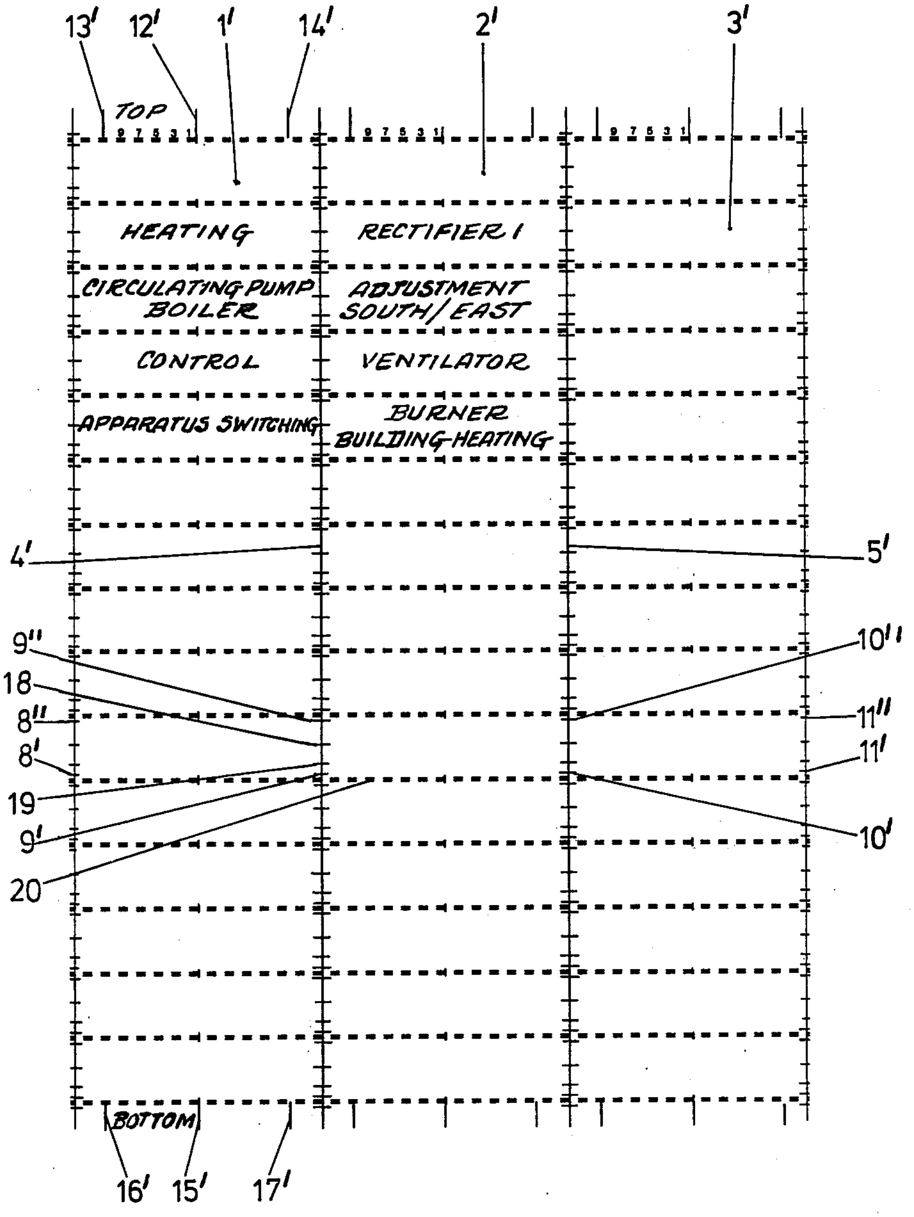
FIG. 2 shows another embodiment of a base for preparing labels.

It is at once clear that this method of the invention thus makes it possible, in an easy way and making use of equipment which is customarily to be found in offices, to prepare a large number of accurate labels of at least the same width quickly—labels which have the same or different lettering.

Where labels with a colored background are to be prepared in a corresponding manner, it is necessary to use a base of appropriate color which is not transparent. Such a base can be used in the same way as the base shown in FIG. 1.

Where one wants to make use of a grating to help in lettering the base, since using such a grating simplifies putting the label lettering on the base centrally, a base such as is shown in FIG. 2 can be used.

The base shown in FIG. 2, like that shown in FIG. 1, has three columns 1', 2' and 3', and the column 2' is bordered by two parallel lines 4' and 5', which at the same time form the boundary of the adjoining column. As is indicated in column 1', the middle of the columns is indicated by markings 12' and 15'. Markings for rows are also located at the dividing lines 20. Those dividing lines are made by double strokes whose width and distance apart correspond to the width of a letter, so that they can be used to achieve a placement of the letters centrally with respect to the middle of the columns. For additional assistance in distributing the characters to be used on a label, horizontal middle-line markings (18 on line 4') and supplementary markings (19 on line 4') are provided which are used when a label is to have two lines of text.

The base, bound with a plastic foil and/or a backing foil or material to form a composite sheet which has been described, is first cut row by row along the upper and lower label-bordering markings, which are only shown for one line—namely, the upper label-bordering markings 8", 9", 10" and 11" and the lower label-bordering markings 8', 9', 10' and 11'. After the prepared base has been cut into individual strips, these are then aligned with respect to the middle of a column. For this purpose, a grating with a middle line, for example, is used and the strips are laid on it so that the middle of the labels contained within the column coincides with the middle line of the grating, or else the column boundary lines 4' and 5' of the strips are brought into alignment. In any case, at least the lower edges of all aligned strips run parallel to each other. This parallel arrangement can be achieved either by laying the strips on a cross hatched base or aligning the strips in relation to appropriate pins which are arranged in pairs on parallel lines, with the distance between adjacent lines being greater than the height of the cut strips.

The strips, which are then joined to each other in a realignment as before in the area of a column by means of the carrier film or material, are then cut, using the markings 13', 16' and 14', 17' or the markings of the column concerned, so that a column of exactly dimensioned, accurate, finished labels results.

The strip sections not held by the carrier material during this cutting are processed into finished labels in the same manner by aligning them by columns, joining them by means of carrier material and cutting them. Alternatively, the respective areas of each column may be joined by carrier material and the second cutting may be performed consecutively on each column.

Although only two exemplary embodiments of the methods of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. Method of preparing a large number of labels using a base sheet having a front and rear face, the method comprising the steps of:

(1) placing markings on said front face for rows and columns and placing symbols of the labels on said front face of said base sheet arranged in said rows and columns;

(2) forming a composite sheet by cementing at least one reinforcement sheet onto said base sheet;

(3) cutting said composite sheet along a first outer edge parallel to said rows and along a second side edge perpendicular to said first outer edge;

(4) laying said composite sheet with one of said first and second edges against a bearing surface and cutting said composite sheet through both said base sheet and said at least one reinforcement sheet in a first direction perpendicular to said one of said first and second edges along said markings into disconnected strips;

(5) connecting said strips in their original alignment by applying a carrier material to said strips; and (6) laying said connected strips with the remaining edge against a bearing surface and cutting said strips along said markings in a second direction perpendicular to said first direction.

2. Method as in claim 1 wherein said step of connecting said strips comprises the step of covering all of said columns including the common edges of adjoining columns.

3. Method for preparing a large number of labels using a base sheet having a front face and a rear face, the method comprising the steps of:

(1) placing markings on said front face and symbols of the labels on said front face of said base sheet arranged in said rows and columns;

(2) forming a composite sheet by cementing at least on reinforcement sheet onto said base;

(3) cutting said composite sheet along a first outer edge parallel to said rows and along a second side edge perpendicular to said first outer edge;

(4) laying said composite sheet with said second edge against a bearing surface and cutting said composite sheet through both said base sheet and said at least one reinforcement sheet row-by-row along said row markings into disconnected strips;

(5) aligning said strips with respect to one of said columns and connecting said strips with a carrier material;

(6) cutting along the edges of said one column so as to separate said one column from the remainder of said base sheet, leaving free the remaining portion of each of said strips and carrier material; and (7) repeating steps (5) and (6) for said remaining portions of said strips.

4. Method as in any of claims 1–3 wherein said step of connecting said strips comprises the step of cementing said carrier material to said strips.

5. Method as in any of claims 1–3 wherein said step of connecting said strips comprises the step of applying a pliable carrier material.

6. Method as in claim 4 wherein said step of connecting said strips comprises the step of applying a pliable carrier material.

7. Method as in claim 1 or claim 3 wherein said step of cementing at least one reinforcement sheet comprises the step of cementing a transparent plastic foil onto said front face.

8. Method as in claim 7 wherein said step of cementing at least one reinforcement sheet comprises the step of cementing a backing foil to said rear face.

9. Method as in claim 1 or claim 3 wherein said step of cementing at least one reinforcement sheet comprises the step of cementing a backing foil to said rear face.

10. Method of preparing a large number of labels using a base sheet having a front and rear face, the method comprising the steps of:

(1) placing markings on said front face for rows and columns and placing symbols of the labels on said front face of said base sheet arranged in said rows and columns;

(2) cementing at least one reinforcement sheet onto said base sheet;

(3) cutting said base sheet and said at least one reinforcement sheet along said row markings into disconnected strips;

(4) rearranging said strips so that the strips of one column are realigned;

(5) applying a carrier material to said strips in the area of said one column;

(6) cutting said strips along the markings of said one column; and (7) repeating said steps of realigning, applying a carrier material and cutting along the markings of the columns for each of the remaining columns.

11. Method as in claim 1 wherein said said carrier material comprises a single sheet and said step (6) includes the step of cutting said strips and said sheet of carrier material along said markings.

12. Method as in claim 1 or claim 3 wherein said first outer edge and said second side edge consist of edges of said base sheet, said step of cutting said composite sheet comprises the step of cutting through said base sheet along said first outer edge and along said second side edge.

* * * * *